United States Patent [19]
Martini

[11] Patent Number: 4,643,863
[45] Date of Patent: Feb. 17, 1987

[54] PROCESS FOR MAKING REINFORCED SEALING GASKETS

[75] Inventor: Gino Martini, Biella, Italy

[73] Assignee: Tako S.p.A., Turin, Italy

[21] Appl. No.: 695,831

[22] Filed: Jan. 28, 1985

[30] Foreign Application Priority Data

Oct. 22, 1984 [IT] Italy .................... 68041 A/84

[51] Int. Cl.$^4$ .................................. B29C 39/10
[52] U.S. Cl. ...................... 264/219; 249/57; 249/83; 264/36; 264/265; 264/275; 264/279; 264/DIG. 67; 425/447
[58] Field of Search ............ 264/36, 46.7, 279.1, 264/316, DIG. 67, 219, 220, 265, 275, 279; 249/57; 425/87, 375, 376 R, 458, DIG. 42, DIG. 47, DIG. 57, DIG. 60, 447

[56] References Cited

U.S. PATENT DOCUMENTS

| 2,893,058 | 7/1959 | Wurtz et al. ............ 264/DIG. 67 |
| 3,458,373 | 7/1969 | Knipp et al. ............ 264/279.1 |
| 4,059,564 | 11/1977 | Coughlan et al. ......... 425/DIG. 47 |
| 4,519,567 | 5/1985 | Rautenberg ............... 264/279.1 |

FOREIGN PATENT DOCUMENTS 203026 11/1983 Japan .................... 264/46.7

*Primary Examiner*—James Lowe
*Attorney, Agent, or Firm*—Cushman, Darby & Cushman

[57] ABSTRACT

The process provides for depositing, on a non-adhesive support, a thread of a fluid material for gasket manufacture from a nozzle that is displaced above the support along a path coinciding with the gasket layout, with subsequent curing of the fluid material. According to the invention, a stiff, wirelike reinforcement is placed on the support before deposition, the reinforcement corresponding in shape to the outline of the gasket that is to be manufactured, and having an adhesive surface with respect to the fluid material of the gasket, so that the subsequently deposited thread of fluid material incorporates the reinforcement and becomes bonded to it. The invention also relates to the product obtained by the process.

7 Claims, 5 Drawing Figures

PROCESS FOR MAKING REINFORCED SEALING GASKETS

BACKGROUND OF THE INVENTION

This invention relates to a process for manufacturing reinforced sealing gaskets, by depositing elastomeric polymers and the like, while in the fluid state, and subsequently curing them. The invention also relates to the product obtained by such process.

Planar gaskets made by depositing and then curing a thread of a fluid elastomer or other polymer onto a non-adhesive support and then moving the cured thread for use as a gasket have been known for some time. Moreover, in the copending U.S. patent application Ser. No. 695830 for "Process for making sealing gaskets, and gasket so obtained", claiming priority of Italian Pat. Appln. No. 67974-A/84, the Applicant has now proposed a technique of deposition of a fluid material by which non-planar gaskets can be economically obtained.

A technique of assembly has become recently widespread, particularly in the automobile industry, whereby, for sealing statically coupled surfaces, the conventional gasket is replaced with a thread of an elastomer which is directly deposited, while in the fluid state, onto the surface of the part, the elastomer being subsequently cured so that it becomes bonded to the surface. Deposition is made from a nozzle that is displaced by numerically controlled manipulators capable of moving along two or three coordinates.

The above technique dispenses with the fixed costs of the molds or dies required for the manufacture of conventional gaskets made by punching or injection-molding, while the quality is kept at a level equal or superior to the quality obtainable with a conventional gasket. In particular, such method of assembly is especially advantageous with non-planar layouts, because it then replaces a gasket that otherwise would have to be made by injection-molding, and therefore inherently expensive.

However, such method of direct deposition on the part during assembly is not free from practical drawbacks. If the deposition station breaks down, it is not always possible to substitute readymade gaskets, as these may not yet be available commercially. Even when nozzle-deposited spare gaskets are available, these are soft and supple, and therefore not adapted to be manipulated by robots. If the gasket has a planar outline, it may be possible to use punched reinforced gaskets, which are stiff and relatively cheap. However, in the case of non-planar gaskets, where direct deposition affords its best usefulness, manufactures, in order to avoid the shutdown of the entire assembly line, have to provide expensive emergency equipment, which defeats to a large extent the saving inherent in direct deposition.

Another drawback of nozzle-deposited gaskets is that, because of their high compliance, they will run out and even be disintegrated if subjected to strong pressure. Their degree of compliance can be adjusted only to a limited extent, because of the inherent softness of the materials used, such as silicones and polyurethanes. As a consequence of this shortcoming, nozzle-deposited gaskets have been kept away from many applications where their low cost and easy adaptability would otherwise make them attractive.

SUMMARY OF THE INVENTION

Therefore, it is the main object of the invention to provide a process for making gaskets by depositing fluid material from a nozzle, by which a good shape stability is achieved, while keeping down manufacturing costs, without a need for expensive investment in tools. More particularly, the object of the invention is to allow for manufacturing reinforced sealing gaskets that can also be installed by conventional robots in original equipment, as an alternative to direct deposition.

Another object of the invention is to provide a method for making reinforced sealing gaskets by nozzle-deposition of a fluid material, in which the reinforcement can act as a spacer between the coupled surfaces, thus preventing running out or tearing of the gasket under pressure.

A further object of the invention is to provide reinforced gaskets obtained by deposition of fluid material, such that manual installation of spares is also expedited.

Such objects are achieved by the invention, together with other objects and advantages such as will appear from the following specification, with a process for making reinforced sealing gaskets, wherein a thread of a fluid material for gasket manufacture is deposited, on a non-adhesive support, from a nozzle that is displaced above the support along a trajectory corresponding to the outline of the gasket, with subsequent curing of the fluid material, characterized in that it comprises the following steps:

(a) preparing a support so that its surface contains the outline of the gasket to be made;

(b) preparing a wirelike reinforcing element having an outline corresponding to the outline of the gasket to be manufactured and having an adhesive surface with respect to said fluid material;

(c) positioning the support and the reinforcing element with respect to the nozzle, so that the reinforcing element lies everywhere on the support;

(d) deposit a thread of fluid material from the nozzle while displacing the nozzle at a fixed distance over and along the reinforcing element so that the fluid material, on subsequent curing, incorporates the reinforcing element and becomes bonded to it.

BRIEF DESCRIPTION OF THE DRAWINGS

Preferred embodiments of invention, give by way of non-limiting examples, will now be described with reference to the attached drawings, wherein.

DESCRIPTION OF PREFERRED EMBODIMENTS

Figure 1:
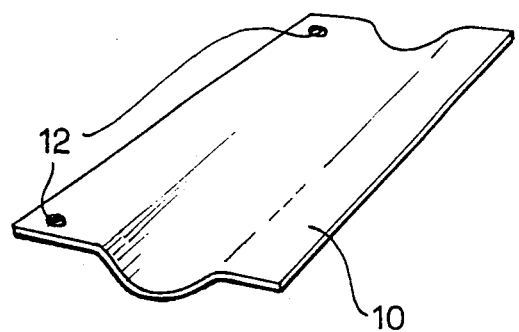
FIG. 1 is a prospective view of a gasket support used in carrying out the invention.

With reference to FIG. 1, according to the invention a support 10 is prepared, of PVC sheet or other suitable material, provided with register means such as holes 12, and having a surface containing the outline of the gasket that is to be manufactured. In the example of FIG. 1, the support is hot-pressed from a thermoplastic sheet so that its shape corresponds to the outline of a gasket extending in three dimensions, according to the teachings of said copending Patent Application in the Applicant's name. Where the gasket outline is planar, the support will be substantially flat.

Figure 4:
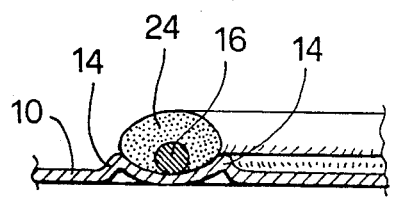
FIG. 4 is a transversal cross-section view, on an enlarged scale, of a first example of a gasket according to the invention, sticking to the support.

Preferably, support 10 is molded with rises 14 (not shown for clarity in FIG. 1, but visible in FIG. 4), defining the outline of the gasket, for purposes that will appear in the following. The support is then made non-adhesive with respect to the material of the gasket, by techniques known per se, and that it is therefore not necessary to describe.

Figure 2:
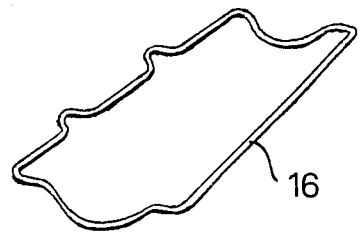
FIG. 2 is a prospective view of a reinforcement used in carrying out the invention.

Separately, a metal reinforcement 16 is made, shown in FIG. 2, consisting in a wirelike, rigid core having the outline of the desired gasket, and it is rendered adhesive to the material of the gasket, unless it already has inherent adhesivity. The reinforcement is preferably made from stiff metal wire, by means of known wire-bending machines, although it can also be made of punched metal sheet or by other desired means. Depending on whether the gasket extends over two or three dimensions, the reinforcement 16, as well as support 10, has a planar or a non-planar outline.

The cross-section of core 16 is preferably round, although it can be square, flat, and with a knurled or rough surface, in order to improve the adhesion to the material of the gasket, as will appear in the sequel.

Figure 3:
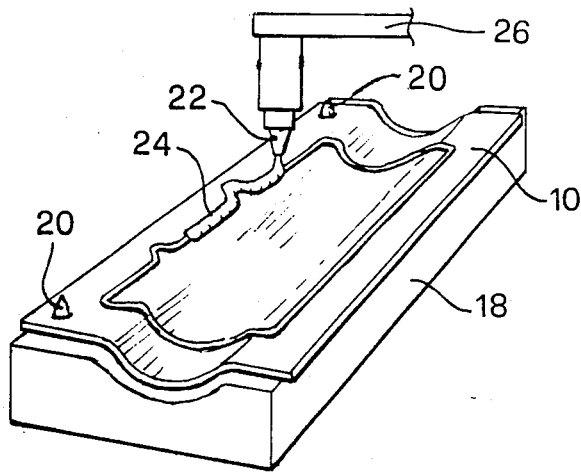
FIG. 3 is a view of the deposition step of a thread of fluid material onto the support of FIG. 1, by using the reinforcement of FIG. 2, according to the inventive process.

With particular reference to FIG. 3, support 10 is now placed on a stand 18 provided with reference dowels 20, adapted to engage the holes 12 of the support in order to align it with a nozzle 22 carried by a manipulator or robot 26; and reinforcement 16 is then placed on support 10, in register with the desired outline of deposition of fluid material, the references afforded by rises 14 being used to this purpose. Manipulator 26 should be capable of movement along two or three coordinates, depending as the gasket is planar or three-dimensional, and should be capable of being controlled to follow a trajectory corresponding to the outline of the gasket, by techniques known per se.

A thread 24 of a fluid elastomer is now deposited along the outline of reinforcement 16 by means of said nozzle 22, the above manipulator being controlled by a control device, such as a suitably programmed, microprocessor-based device (not shown). The fluid material surrounds the reinforcement and is bonded to it during the subsequent curing, thus incorporating it into an integral stucture, having the properties of elasticity and compliance that are peculiar of this kind of gaskets, while also having a stability of shape due to the metal core, even after removing the gasket from its support. The gasket can therefore be robot-installed in the assembly line, because its stiffness allows it to be moved without intricate manipulations. For the same reasons, the gasket so obtained is also easier and quicker to install for a human operator.

Preferably, the support sheet will be supported, during deposition, on a stand having a perforated upper surface matching the shape of the support sheet and connected to a vacuum source for holding the support flat and stationary by depression, as described and shown in the above copending Patent Application by the same Applicant.

Moreover, the flow of fluid polymer deposited by nozzle 22 can be modulated along its path, in order to obtain accurately defined gaskets, whose thickness is everywhere adequate to the pressures that are to be withstood.

The gasket thus obtained will usually be marketed together with its support, so that it suffers no distortions during prolonged storage, and the end user will peel it off its support at the time of use. To such an end the support, in order to make peeling easy without misshaping the metal core, is preferably made of a pliable material.

Figure 5:
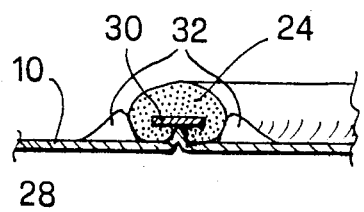
FIG. 5 is a transversal cross-section view, on an enlarged scale, of a second example of a gasket according to the invention, sticking to the support.

FIG. 5 shows a second embodiment of a gasket according to the invention, in which support 10 has a ridge 28 coinciding with the gasket's outline, and the reinforcement consist in a metal strap 30, instead of a wire having a round cross-section. With this embodiment the fluid polymer is more certain to properly incorporate the reinforcement everywhere, pervading the lateral gaps between the support and the reinforcement. In this case, instead of the continuous rises 14 of FIG. 4, which define a groove or channel for positioning reinforcement 16 and the completed gasket, separate projections 32 are provided for positioning the reinforcement, spaced along the path.

Materials suitable for use as fluid materials for the gasket are those already known in the manufacture of planar gaskets by nozzle deposition, such as silicone materials, polyurethane materials, or even PVC, with or without added catalizer, the materials being monocomponent or bicomponent, and adapted to be hot-cured or cured at ambient temperature. In general, any kind of elastomeric material can be used, or in some cases also other kinds of synthetic resins.

Although a few preferred embodiments of the invention have been described, these can be changed or modified with equivalent means, within the teachings of the invention, without departing from its scope.

I claim:

1. A process for making reinforced sealing gaskets for use as replacements of directly deposited sealing members, comprising:
   (a) preparing a support sheet so that its surface contains the outline of the gasket to be made;
   (b) preparing a wirelike reinforcing element having an outline corresponding to the outline of the gasket to be manufactured and having an adhesive surface with respect to said fluid material;
   (c) positioning the support and the reinforcing element with respect to a material-dispensing nozzle carried by a manipulator capable of being controlled to move the nozzle along a desired trajectory;
   (d) depositing a thread of a fluid, curable material of a relatively high viscosity from the nozzle while displacing the nozzle at a fixed distance over and along the reinforcing element so that the fluid material, on subsequent curing, incorporates the reinforcing element and becomes bonded to it.

2. The process of claim 1, wherein the fluid material is a monocomponent polymer.

3. The process of claim 1, wherein the fluid material is a bicomponent polymer.

4. The process of claim 1, wherein the fluid material is chosen from one of the following: silicones, polyurethanes, PVC.

5. The process of claim 1, wherein the reinforcing element is metal wire bent in the shape of the gasket outline.

6. The process of claim 1, wherein the gasket support has a groove or depression along the outline of the gasket, adapted to receive the reinforcing element.

7. The process of claim 1, wherein the gasket support has projections along the outline of the gasket, adapted to act as positioning seats for the reinforcing element.

* * * * *